United States Patent
Marcovitch et al.

(10) Patent No.: US 12,007,921 B2
(45) Date of Patent: Jun. 11, 2024

(54) PROGRAMMABLE USER-DEFINED PERIPHERAL-BUS DEVICE IMPLEMENTATION USING DATA-PLANE ACCELERATOR (DPA)

(71) Applicant: MELLANOX TECHNOLOGIES, LTD., Yokneam (IL)

(72) Inventors: Daniel Marcovitch, Yokneam Illit (IL); Eliav Bar-Ilan, Or Akiva (IL); Ran Avraham Koren, Beijing (CN); Liran Liss, Atzmon-Segev (IL); Oren Duer, Kochav Yair (IL); Shahaf Shuler, Kibbutz Lochamei Hagetaot (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 14 days.

(21) Appl. No.: 17/979,013

(22) Filed: Nov. 2, 2022

(65) Prior Publication Data
US 2024/0143528 A1     May 2, 2024

(51) Int. Cl.
*G06F 13/28* (2006.01)
*G06F 13/42* (2006.01)

(52) U.S. Cl.
CPC .......... *G06F 13/28* (2013.01); *G06F 13/4221* (2013.01); *G06F 2213/0024* (2013.01)

(58) Field of Classification Search
CPC ................ G06F 13/28; G06F 13/4221; G06F 2213/0024
See application file for complete search history.

(56) References Cited

U.S. PATENT DOCUMENTS

| | | |
|---|---|---|
| 5,003,465 A | 3/1991 | Chisholm et al. |
| 5,463,772 A | 10/1995 | Thompson et al. |
| 5,615,404 A | 3/1997 | Knoll et al. |
| 5,768,612 A | 6/1998 | Nelson |
| 5,864,876 A | 1/1999 | Rossum et al. |
| 5,893,166 A | 4/1999 | Frank et al. |

(Continued)

FOREIGN PATENT DOCUMENTS

| | | |
|---|---|---|
| EP | 1657878 A1 | 5/2006 |
| EP | 2463782 A2 | 6/2012 |
| WO | 2010062679 A2 | 6/2010 |

OTHER PUBLICATIONS

U.S. Appl. No. 17/211,928 Office Action dated May 25, 2023.
(Continued)

*Primary Examiner* — Farley Abad
(74) *Attorney, Agent, or Firm* — KLIGLER & ASSOCIATES PATENT ATTORNEYS LTD.

(57) ABSTRACT

A network adapter includes a network interface, a bus interface, a hardware-implemented data-path and a programmable Data-Plane Accelerator (DPA). The network interface is to communicate with a network. The bus interface is to communicate with an external device over a peripheral bus. The hardware-implemented data-path includes a plurality of packet-processing engines to process data units exchanged between the network and the external device. The DPA is to expose on the peripheral bus a User-Defined Peripheral-bus Device (UDPD), to run user-programmable logic that implements the UDPD, and to process transactions issued from the external device to the UDPD by reusing one or more of the packet-processing engines of the data-path.

19 Claims, 3 Drawing Sheets

(56) References Cited

U.S. PATENT DOCUMENTS

| | | |
|---|---|---|
| 5,954,802 A | 9/1999 | Griffith |
| 6,070,219 A | 5/2000 | Mcalpine et al. |
| 6,226,680 B1 | 5/2001 | Boucher et al. |
| 6,321,276 B1 | 11/2001 | Forin |
| 6,581,130 B1 | 6/2003 | Brinkmann et al. |
| 6,701,405 B1 | 3/2004 | Adusumilli et al. |
| 6,766,467 B1 | 7/2004 | Neal et al. |
| 6,789,143 B2 | 9/2004 | Craddock et al. |
| 6,901,496 B1 | 5/2005 | Mukund et al. |
| 6,981,027 B1 | 12/2005 | Gallo et al. |
| 7,171,484 B1 | 1/2007 | Krause et al. |
| 7,225,277 B2 | 5/2007 | Johns et al. |
| 7,263,103 B2 | 8/2007 | Kagan et al. |
| 7,299,266 B2 | 11/2007 | Boyd et al. |
| 7,395,364 B2 | 7/2008 | Higuchi et al. |
| 7,464,198 B2 | 12/2008 | Martinez et al. |
| 7,475,398 B2 | 1/2009 | Nunoe |
| 7,502,884 B1 | 3/2009 | Shah et al. |
| 7,548,999 B2 | 6/2009 | Haertel et al. |
| 7,577,773 B1 | 8/2009 | Gandhi et al. |
| 7,657,659 B1 | 2/2010 | Lambeth et al. |
| 7,720,064 B1 | 5/2010 | Rohde |
| 7,752,417 B2 | 7/2010 | Manczak et al. |
| 7,809,923 B2 | 10/2010 | Hummel et al. |
| 7,921,178 B2 | 4/2011 | Haviv |
| 7,921,237 B1 | 4/2011 | Holland et al. |
| 7,945,752 B1 | 5/2011 | Miller et al. |
| 8,001,592 B2 | 8/2011 | Hatakeyama |
| 8,006,297 B2 | 8/2011 | Johnson et al. |
| 8,010,763 B2 | 8/2011 | Armstrong et al. |
| 8,051,212 B2 | 11/2011 | Kagan et al. |
| 8,103,785 B2 | 1/2012 | Crowley et al. |
| 8,255,475 B2 | 8/2012 | Kagan et al. |
| 8,260,980 B2 | 9/2012 | Weber et al. |
| 8,346,919 B1 | 1/2013 | Eiriksson et al. |
| 8,447,904 B2 | 5/2013 | Riddoch |
| 8,504,780 B2 | 8/2013 | Mine et al. |
| 8,645,663 B2 | 2/2014 | Kagan et al. |
| 8,745,276 B2 | 6/2014 | Bloch et al. |
| 8,751,701 B2 | 6/2014 | Shahar et al. |
| 8,824,492 B2 | 9/2014 | Wang et al. |
| 8,892,804 B2 | 11/2014 | Morein et al. |
| 8,949,486 B1 | 2/2015 | Kagan et al. |
| 9,038,073 B2 | 5/2015 | Kohlenz et al. |
| 9,092,426 B1 | 7/2015 | Bathija et al. |
| 9,298,723 B1 | 3/2016 | Vincent |
| 9,331,963 B2 | 5/2016 | Krishnamurthi et al. |
| 9,483,290 B1 | 11/2016 | Mantri et al. |
| 9,678,818 B2 | 6/2017 | Raikin et al. |
| 9,696,942 B2 | 7/2017 | Kagan et al. |
| 9,727,503 B2 | 8/2017 | Kagan et al. |
| 9,830,082 B1 | 11/2017 | Srinivasan et al. |
| 9,904,568 B2 | 2/2018 | Vincent et al. |
| 10,078,613 B1 | 9/2018 | Ramey |
| 10,120,832 B2 | 11/2018 | Raindel et al. |
| 10,135,739 B2 | 11/2018 | Raindel et al. |
| 10,152,441 B2 | 12/2018 | Liss et al. |
| 10,162,793 B1 | 12/2018 | Bshara et al. |
| 10,210,125 B2 | 2/2019 | Burstein |
| 10,218,645 B2 | 2/2019 | Raindel et al. |
| 10,423,774 B1 | 4/2019 | Zelenov et al. |
| 10,382,350 B2 | 8/2019 | Bohrer et al. |
| 10,417,156 B2 | 9/2019 | Hsu et al. |
| 10,628,622 B1 | 4/2020 | Sivaraman et al. |
| 10,657,077 B2 | 5/2020 | Ganor et al. |
| 10,671,309 B1 | 6/2020 | Glynn |
| 10,684,973 B2 | 6/2020 | Connor et al. |
| 10,715,451 B2 | 7/2020 | Raindel et al. |
| 10,824,469 B2 | 11/2020 | Hirshberg et al. |
| 10,841,243 B2 | 11/2020 | Levi et al. |
| 10,999,364 B1 | 5/2021 | Itigin et al. |
| 11,003,607 B2 | 5/2021 | Ganor et al. |
| 11,080,225 B2 | 8/2021 | Borikar et al. |
| 11,086,713 B1 | 8/2021 | Sapuntzakis et al. |
| 11,126,575 B1 | 9/2021 | Aslanidis et al. |
| 11,537,548 B2 | 12/2022 | Makhija et al. |
| 2002/0152327 A1 | 10/2002 | Kagan et al. |
| 2003/0023846 A1 | 1/2003 | Krishna et al. |
| 2003/0046530 A1 | 3/2003 | Poznanovic |
| 2003/0120836 A1 | 6/2003 | Gordon |
| 2004/0010612 A1* | 1/2004 | Pandya ............... H04L 9/40 709/213 |
| 2004/0039940 A1 | 2/2004 | Cox et al. |
| 2004/0057434 A1 | 3/2004 | Poon et al. |
| 2004/0158710 A1 | 8/2004 | Buer et al. |
| 2004/0221128 A1 | 11/2004 | Beecroft et al. |
| 2004/0230979 A1 | 11/2004 | Beecroft et al. |
| 2005/0102497 A1 | 5/2005 | Buer |
| 2005/0198412 A1 | 9/2005 | Pedersen et al. |
| 2005/0216552 A1 | 9/2005 | Fineberg et al. |
| 2006/0095754 A1 | 5/2006 | Hyder et al. |
| 2006/0104308 A1 | 5/2006 | Pinkerton et al. |
| 2006/0259291 A1* | 11/2006 | Dunham ............ G06F 11/1482 703/25 |
| 2006/0259661 A1 | 11/2006 | Feng et al. |
| 2007/0011429 A1 | 1/2007 | Sangili et al. |
| 2007/0061492 A1 | 3/2007 | Van Riel |
| 2007/0223472 A1 | 9/2007 | Tachibana et al. |
| 2007/0226450 A1 | 9/2007 | Engbersen et al. |
| 2007/0283124 A1 | 12/2007 | Menczak et al. |
| 2007/0297453 A1 | 12/2007 | Niinomi |
| 2008/0005387 A1 | 1/2008 | Mutaguchi |
| 2008/0147822 A1 | 6/2008 | Benhase et al. |
| 2008/0147904 A1 | 6/2008 | Freimuth et al. |
| 2008/0168479 A1 | 7/2008 | Purtell et al. |
| 2008/0313364 A1 | 12/2008 | Flynn et al. |
| 2009/0086736 A1 | 4/2009 | Foong et al. |
| 2009/0106771 A1 | 4/2009 | Benner et al. |
| 2009/0204650 A1 | 8/2009 | Wong et al. |
| 2009/0319775 A1 | 12/2009 | Buer et al. |
| 2009/0328170 A1 | 12/2009 | Williams et al. |
| 2010/0030975 A1 | 2/2010 | Murray et al. |
| 2010/0095053 A1 | 4/2010 | Bruce et al. |
| 2010/0095085 A1 | 4/2010 | Hummel et al. |
| 2010/0211834 A1 | 8/2010 | Asnaashari et al. |
| 2010/0217916 A1 | 8/2010 | Gao et al. |
| 2010/0228962 A1 | 9/2010 | Simon et al. |
| 2010/0322265 A1* | 12/2010 | Gopinath ............ H04L 49/901 370/417 |
| 2011/0023027 A1 | 1/2011 | Kegel et al. |
| 2011/0119673 A1 | 5/2011 | Bloch et al. |
| 2011/0213854 A1 | 9/2011 | Haviv |
| 2011/0246597 A1 | 10/2011 | Swanson et al. |
| 2012/0314709 A1 | 12/2012 | Post et al. |
| 2013/0067193 A1 | 3/2013 | Kagan et al. |
| 2013/0080651 A1 | 3/2013 | Pope et al. |
| 2013/0103777 A1 | 4/2013 | Kagan et al. |
| 2013/0125125 A1 | 5/2013 | Karino et al. |
| 2013/0142205 A1 | 6/2013 | Munoz |
| 2013/0145035 A1* | 6/2013 | Pope ............... H04L 69/161 709/227 |
| 2013/0159568 A1 | 6/2013 | Shahar et al. |
| 2013/0263247 A1 | 10/2013 | Jungck et al. |
| 2013/0276133 A1 | 10/2013 | Hodges et al. |
| 2013/0311746 A1 | 11/2013 | Raindel et al. |
| 2013/0325998 A1 | 12/2013 | Hormuth et al. |
| 2013/0329557 A1 | 12/2013 | Petry |
| 2013/0347110 A1 | 12/2013 | Dalal |
| 2014/0089450 A1 | 3/2014 | Raindel et al. |
| 2014/0089451 A1 | 3/2014 | Eran et al. |
| 2014/0089631 A1 | 3/2014 | King |
| 2014/0122828 A1 | 5/2014 | Kagan et al. |
| 2014/0129741 A1 | 5/2014 | Shahar et al. |
| 2014/0156894 A1 | 6/2014 | Tsirkin et al. |
| 2014/0181365 A1 | 6/2014 | Fanning et al. |
| 2014/0185616 A1 | 7/2014 | Bloch et al. |
| 2014/0244965 A1 | 8/2014 | Manula et al. |
| 2014/0254593 A1 | 9/2014 | Mital et al. |
| 2014/0282050 A1 | 9/2014 | Quinn et al. |
| 2014/0282561 A1 | 9/2014 | Holt et al. |
| 2015/0006663 A1 | 1/2015 | Huang |
| 2015/0012735 A1 | 1/2015 | Tamir et al. |
| 2015/0032835 A1 | 1/2015 | Sharp et al. |
| 2015/0081947 A1 | 3/2015 | Vucinic et al. |

(56) References Cited

U.S. PATENT DOCUMENTS

| | | | |
|---|---|---|---|
| 2015/0100962 | A1 | 4/2015 | Morita et al. |
| 2015/0288624 | A1 | 10/2015 | Raindel et al. |
| 2015/0319243 | A1 | 11/2015 | Hussain et al. |
| 2015/0347185 | A1 | 12/2015 | Holt et al. |
| 2015/0355938 | A1 | 12/2015 | Jokinen et al. |
| 2016/0065659 | A1 | 3/2016 | Bloch et al. |
| 2016/0085718 | A1 | 3/2016 | Huang |
| 2016/0132329 | A1 | 5/2016 | Gupte et al. |
| 2016/0154673 | A1 | 6/2016 | Morris |
| 2016/0226822 | A1 | 8/2016 | Zhang et al. |
| 2016/0342547 | A1 | 11/2016 | Liss et al. |
| 2016/0350151 | A1 | 12/2016 | Zou et al. |
| 2016/0378529 | A1 | 12/2016 | Wen |
| 2017/0031810 | A1 | 2/2017 | Bonzini et al. |
| 2017/0075855 | A1 | 3/2017 | Sajeepa et al. |
| 2017/0104828 | A1* | 4/2017 | Brown ............... H04L 67/142 |
| 2017/0180273 | A1 | 6/2017 | Daly et al. |
| 2017/0187629 | A1 | 6/2017 | Shalev et al. |
| 2017/0237672 | A1 | 8/2017 | Dalal |
| 2017/0264622 | A1 | 9/2017 | Cooper et al. |
| 2017/0286157 | A1 | 10/2017 | Hasting et al. |
| 2017/0371835 | A1 | 12/2017 | Ranadive et al. |
| 2018/0004954 | A1 | 1/2018 | Liguori et al. |
| 2018/0067893 | A1 | 3/2018 | Raindel et al. |
| 2018/0109471 | A1 | 4/2018 | Chang et al. |
| 2018/0114013 | A1 | 4/2018 | Sood et al. |
| 2018/0167364 | A1 | 6/2018 | Dong et al. |
| 2018/0210751 | A1 | 7/2018 | Pepus et al. |
| 2018/0219770 | A1 | 8/2018 | Wu et al. |
| 2018/0219772 | A1 | 8/2018 | Koster et al. |
| 2018/0246768 | A1 | 8/2018 | Palermo et al. |
| 2018/0262468 | A1 | 9/2018 | Kumar et al. |
| 2018/0285288 | A1 | 10/2018 | Bernat et al. |
| 2018/0329828 | A1 | 11/2018 | Apfelbaum et al. |
| 2019/0012350 | A1 | 1/2019 | Sindhu et al. |
| 2019/0026157 | A1 | 1/2019 | Suzuki et al. |
| 2019/0116127 | A1 | 4/2019 | Pismenny et al. |
| 2019/0124113 | A1 | 4/2019 | Labana et al. |
| 2019/0163364 | A1 | 5/2019 | Gibb et al. |
| 2019/0173846 | A1 | 6/2019 | Patterson et al. |
| 2019/0190892 | A1 | 6/2019 | Menachem et al. |
| 2019/0199690 | A1 | 6/2019 | Klein |
| 2019/0243781 | A1* | 8/2019 | Thyamagondlu ....... G06F 13/28 |
| 2019/0250938 | A1 | 8/2019 | Claes et al. |
| 2020/0012604 | A1 | 1/2020 | Agarwal |
| 2020/0026656 | A1 | 1/2020 | Liao et al. |
| 2020/0065269 | A1 | 2/2020 | Balasubramani et al. |
| 2020/0259803 | A1 | 8/2020 | Menachem et al. |
| 2020/0314181 | A1 | 10/2020 | Eran et al. |
| 2020/0401440 | A1 | 12/2020 | Sankaran et al. |
| 2021/0042255 | A1 | 2/2021 | Colenbrander |
| 2021/0111996 | A1 | 4/2021 | Pismenny et al. |
| 2021/0133140 | A1 | 5/2021 | Jeansonne et al. |
| 2021/0203610 | A1 | 7/2021 | Pismenny et al. |
| 2021/0209052 | A1 | 7/2021 | Chen et al. |
| 2022/0075747 | A1 | 3/2022 | Shuler et al. |
| 2022/0092135 | A1 | 3/2022 | Sidman |
| 2022/0100687 | A1 | 3/2022 | Sahin et al. |
| 2022/0103629 | A1* | 3/2022 | Cherian ............... H04L 69/26 |
| 2022/0283964 | A1 | 9/2022 | Burstein et al. |
| 2022/0308764 | A1 | 9/2022 | Pismenny et al. |
| 2022/0309019 | A1 | 9/2022 | Duer et al. |
| 2022/0334989 | A1 | 10/2022 | Bar-Ilan et al. |
| 2022/0391341 | A1 | 12/2022 | Rosenbaum et al. |
| 2023/0010150 | A1 | 1/2023 | Ben-Ishay et al. |

OTHER PUBLICATIONS

"Linux kernel enable the IOMMU—input/output memory management unit support", pp. 1-2, Oct. 15, 2007 downloaded from http://www.cyberciti.biz/tips/howto-turn-on-linux-software-iommu-support.html.

Hummel M., "IO Memory Management Hardware Goes Mainstream", AMD Fellow, Computation Products Group, Microsoft WinHEC, pp. 1-7, 2006.

PCI Express, Base Specification, Revision 3.0, pp. 1-860, Nov. 10, 2010.

NVM Express, Revision 1.0e, pp. 1-127, Jan. 23, 2013.

Infiniband Trade Association, "InfiniBandTM Architecture Specification", vol. 1, Release 1.2.1, pp. 1-1727, Nov. 2007.

Shah et al., "Direct Data Placement over Reliable Transports", IETF Network Working Group, RFC 5041, pp. 1-38, Oct. 2007.

Culley et al., "Marker PDU Aligned Framing for TCP Specification", IETF Network Working Group, RFC 5044, pp. 1-75, Oct. 2007.

"MPI: A Message-Passing Interface Standard", Version 2.2, Message Passing Interface Forum, pp. 1-64, Sep. 4, 2009.

Welsh et al., "Incorporating Memory Management into User-Level Network Interfaces", Department of Computer Science, Cornell University, Technical Report TR97-1620, pp. 1-10, Feb. 13, 1997.

Tsirkin et al., "Virtual I/O Device (VIRTIO) Version 1.1", Committee Specification Draft 01/Public Review Draft 01, OASIS Open, pp. 1-121, Dec. 20, 2018.

"Switchtec PAX Gen 4 Advanced Fabric PCIe Switch Family—PM42100, PM42068, PM42052, PM42036, PM42028," Product Brochure, Microchip Technology Incorporated, pp. 1-2, year 2021.

Regula, "Using Non-Transparent Bridging in PCI Express Systems," PLX Technology, Inc., pp. 1-31, Jun. 2004.

Marcovitch et al., U.S. Appl. No. 17/987,904, filed Nov. 16, 2022.

Marcovitch, U.S. Appl. No. 17/707,555, filed Mar. 29, 2022.

Liss et al., U.S. Appl. No. 17/976,909, filed Oct. 31, 2022.

Mellanox Technologies, "Understanding On Demand Paging (ODP)," Knowledge Article, pp. 1-6, Feb. 20, 2019 downloaded from https://community.mellanox.com/s/article/understanding-on-demand-paging--odp-x.

U.S. Appl. No. 17/372,466 Office Action dated Feb. 15, 2023.

Shirey, "Internet Security Glossary, Version 2", Request for Comments 4949, pp. 1-365, Aug. 2007.

Information Sciences Institute, "Transmission Control Protocol; DARPA Internet Program Protocol Specification", Request for Comments 793, pp. 1-90, Sep. 1981.

InfiniBand TM Architecture Specification vol. 1, Release 1.3, pp. 1-1842, Mar. 3, 2015.

Stevens., "TCP Slow Start, Congestion Avoidance, Fast Retransmit, and Fast Recovery Algorithms", Request for Comments 2001, pp. 1-6, Jan. 1997.

Netronome Systems, Inc., "Open vSwitch Offload and Acceleration with Agilio® CX SmartNICs", White Paper, pp. 1-7, Mar. 2017.

Dierks et al., "The Transport Layer Security (TLS) Protocol Version 1.2", Request for Comments: 5246 , pp. 1-104, Aug. 2008.

Turner et al., "Prohibiting Secure Sockets Layer (SSL) Version 2.0", Request for Comments: 6176, pp. 1-4, Mar. 2011.

Rescorla et al., "The Transport Layer Security (TLS) Protocol Version 1.3", Request for Comments: 8446, pp. 1-160, Aug. 2018.

Comer., "Packet Classification: A Faster, More General Alternative to Demultiplexing", The Internet Protocol Journal, vol. 15, No. 4, pp. 12-22, Dec. 2012.

Salowey et al., "AES Galois Counter Mode (GCM) Cipher Suites for TLS", Request for Comments: 5288, pp. 1-8, Aug. 2008.

Burstein, "Enabling Remote Persistent Memory", SNIA-PM Summit, pp. 1-24, Jan. 24, 2019.

Chung et al., "Serving DNNs in Real Time at Datacenter Scale with Project Brainwave", IEEE Micro Pre-Print, pp. 1-11, Mar. 22, 2018.

Talpey, "Remote Persistent Memory—With Nothing But Net", SNIA-Storage developer conference , pp. 1-30, year 2017.

Microsoft, "Project Brainwave", pp. 1-5, year 2019.

"NVM Express—Base Specifications," Revision 2.0, pp. 1-452, May 13, 2021.

Pismenny et al., "Autonomous NIC Offloads", submitted for evaluation of the 26th International Conference on Architectural Support for Programming Languages and Operating Systems (ASPLOS '21), p. 1-18, Dec. 13, 2020.

Lebeane et al., "Extended Task queuing: Active Messages for Heterogeneous Systems", Proceedings of the International Conference for High Performance Computing, Networking, Storage and Analysis (SC'16), pp. 933-944, Nov. 2016.

(56) References Cited

OTHER PUBLICATIONS

NVM Express Inc., "NVM Express over Fabrics," Revision 1.0, pp. 1-49, Jun. 5, 2016.
U.S. Appl. No. 17/527,197 Office Action dated Sep. 28, 2023.
U.S. Appl. No. 17/976,909 Office Action dated Feb. 21, 2024.
U.S. Appl. No. 17/987,904 Office Action dated Apr. 11, 2024.

* cited by examiner

PROGRAMMABLE USER-DEFINED PERIPHERAL-BUS DEVICE IMPLEMENTATION USING DATA-PLANE ACCELERATOR (DPA)

FIELD OF THE INVENTION

The present invention relates generally to computing and data communication systems, and particularly to methods and systems for user-defined implementation of peripheral-bus devices.

BACKGROUND OF THE INVENTION

Computing systems often use peripheral buses for communication among processors, memories and peripheral devices. Examples of peripheral buses include Peripheral Component Interconnect express (PCIe), Compute Express Link (CXL) bus, NVLink and NVLink-C2C. Peripheral devices may comprise, for example, network adapters, storage devices, Graphics Processing Units (GPUs) and the like.

SUMMARY OF THE INVENTION

An embodiment that is described herein provides a network adapter including a network interface, a bus interface, a hardware-implemented data-path and a programmable Data-Plane Accelerator (DPA). The network interface is to communicate with a network. The bus interface is to communicate with an external device over a peripheral bus. The hardware-implemented data-path includes a plurality of packet-processing engines to process data units exchanged between the network and the external device. The DPA is to expose on the peripheral bus a User-Defined Peripheral-bus Device (UDPD), to run user-programmable logic that implements the UDPD, and to process transactions issued from the external device to the UDPD by reusing one or more of the packet-processing engines of the data-path.

In various embodiments, the UDPD is one of a network adapter, a storage device, a Graphics Processing Unit (GPU) and a Field Programmable Gate Array (FPGA).

In an embodiment, in processing the data units, the data-path is to communicate over the peripheral bus with a network-adapter driver running on the external device, and, in processing the transactions issued to the UDPD, the DPA is to communicate over the peripheral bus with a UDPD driver running on the external device. In another embodiment, in processing the data units, the packet-processing engines in the data-path are to trigger one another in a pipeline independently of the DPA, and, in processing the transactions issued to the UDPD, the one or more of the packet-processing engines are to be invoked by the DPA.

In yet another embodiment, the data-path includes a hardware-implemented transport engine to perform transport-protocol checks and/or offloads on incoming communication data units and to select receive-queues for the incoming communication data units, and the DPA is to re-use the transport engine to perform transport-protocol checks and/or offloads on incoming UDPD data units associated with the UDPD, and to select receive-queues for the incoming UDPD data units.

In still another embodiment, the data-path includes a hardware-implemented address-translation engine to translate between virtual addresses in a first address space and addresses assigned to the communication data units in a second address space, and the DPA is to re-use the address-translation engine to translate between virtual addresses in a third address space and addresses assigned to UDPD data units associated with the UDPD in a fourth address space.

In a disclosed embodiment, the data-path includes at least one hardware-implemented Direct Memory Access (DMA) engine to scatter data from at least some of the communication data units to memory, and to transfer completion notifications for the communication data units, and the DPA is to re-use the DMA engine to scatter data from UDPD data units, associated with the UDPD, to the memory, and to transfer completion notifications for the UDPD data units.

In an example embodiment, the data-path includes a hardware-implemented message-signaled-interrupt engine to trigger the external device with interrupts upon completions of processing of at least some of the data units, and the DPA is to re-use the message-signaled-interrupt engine to trigger the external device with interrupts upon completions of processing of UDPD data units associated with the UDPD.

In an embodiment, the data-path includes an interrupt-moderation engine to throttle a rate of the interrupts that indicate the completions of the communication data units, and the DPA is to re-use the interrupt-moderation engine to throttle a rate of the interrupts that indicate the completions of the UDPD data units. In another embodiment, the data-path includes a doorbell-aggregation engine to coalesce doorbells relating to the communication data units, and the DPA is to re-use the doorbell-aggregation engine to coalesce doorbells relating to UDPD data units associated with the UDPD.

There is additionally provided, in accordance with an embodiment that is described herein, a method in a network adapter. The method includes communicating with a network, and communicating with an external device over a peripheral bus. Using a hardware-implemented data-path that includes a plurality of packet-processing engines, data units exchanged between the network and the external device are processed. Using a programmable Data-Plane Accelerator (DPA), a User-Defined Peripheral-bus Device (UDPD) is exposed on the peripheral bus, user-programmable logic that implements the UDPD is run, and transactions issued from the external device to the UDPD are processed by reusing one or more of the packet-processing engines of the data-path.

There is further provided, in accordance with an embodiment that is described herein, a network adapter including a network interface, a bus interface, a hardware-implemented data-path and a programmable Data-Plane Accelerator (DPA). The network interface is to communicate with a network. The bus interface is to communicate with an external device over a peripheral bus. The hardware-implemented data-path includes a plurality of packet-processing engines, to process data units exchanged between the network and the external device. The DPA is to run user-programmable logic that implements a User-Defined Peripheral-bus Device (UDPD), including reusing, in implementing the UDPD, one or more of the packet-processing engines of the data-path.

The present invention will be more fully understood from the following detailed description of the embodiments thereof, taken together with the drawings in which:

DETAILED DESCRIPTION OF EMBODIMENTS

Overview

Figure 1:
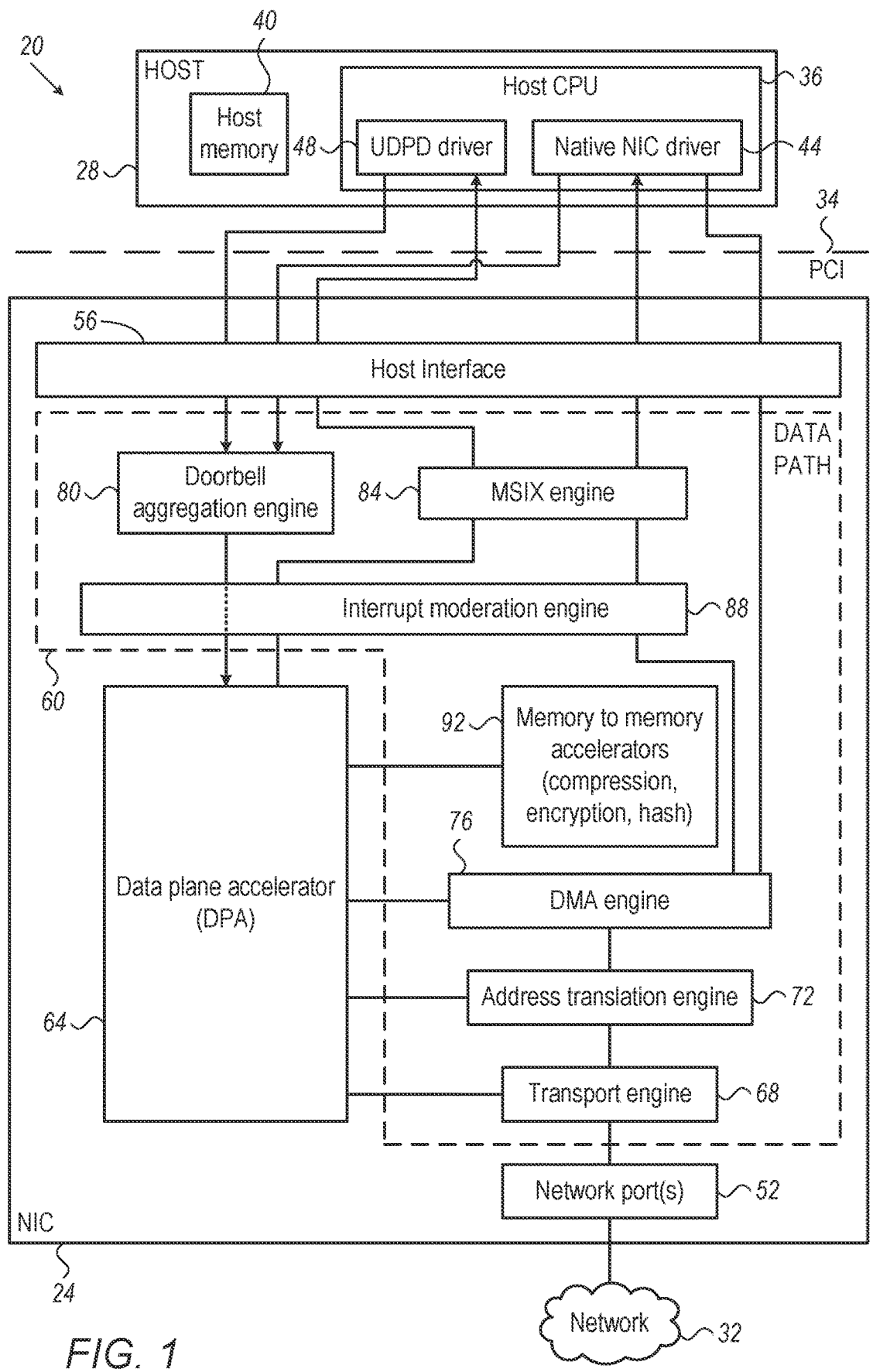
FIG. 1 is a block diagram that schematically illustrates a computing system employing user defined peripheral-bus device implementation (UDDI), in accordance with an embodiment of the present invention.

Embodiments of the present invention that are described herein provide improved methods and systems for user-defined implementation (e.g., software emulation) of peripheral devices in computing systems. In the disclosed embodiments, a network adapter provides users with means for specifying user-defined peripheral devices. This framework is referred to herein as user defined peripheral-bus device implementation (UDDI).

Peripheral devices that can be specified and implemented using the disclosed techniques include, for example, network adapters (e.g., Network Interface Controllers—NICs), storage devices (e.g., Solid State Drives—SSDs), Graphics Processing Units (GPUs) and Field-Programmable Gate Arrays (FPGAs). UDDI may be performed over various types of peripheral buses, e.g., Peripheral Component Interconnect express (PCIe), Compute Express Link (CXL) bus, NVLink and NVLink-C2C. In the present context, the terms "emulation" of a device and "user-defined implementation" of a device are used interchangeably.

As will be described below, the disclosed network adapter comprises a hardware-implemented data-path that comprises various packet-processing engines used for network communication. In addition, the network adapter comprises a programmable Data-Plane Accelerator (DPA) that runs user-programmable logic implementing the UDPD. The DPA implements (e.g., emulates) the UDPD by reusing one or more of the packet-processing engines of the network adapter's data-path.

Various examples of using the same packet-processing engines for network communication and for UDDI are described herein. Data-path packet-processing engines that can be reused for network communication and for UDDI comprise, for example, transport engines, address translation engines, Direct Memory Access (DMA) engines, message-signaled-interrupt (MSI/MSI-X) engines, interrupt moderation engines, doorbell aggregation engines, as well as various "memory-to-memory" accelerators that perform computations such as compression/decompression, encryption/decryption and hashing.

In some embodiments the network adapter communicates over the peripheral bus with a host or other external device. The network adapter exposes two bus interfaces over the peripheral bus, one interface used for network communication and the other interface (referred to as "UDPD interface" or "UDDI interface") used for UDDI. The host runs two software drivers—A "native NIC driver" (also referred to as "network-adapter driver") for performing network communication, and a UDPD driver for interacting with the UDPD. Both drivers are accessible to user applications running on the host.

The methods and systems described herein enable users a high degree of flexibility in specifying peripheral devices. By carrying out the UDDI tasks in the network adapter, the disclosed techniques offload the host of such tasks, and also provide enhanced security and data segregation between different users. By reusing data-path packet-processing engines for both network communication and UDDI, implementation in the network adapter is simpler and more efficient in terms of cost, size and power consumption ("performance per Watt").

System Description

FIG. 1 is a block diagram that schematically illustrates a computing system 20 employing user defined peripheral-bus device implementation (UDDI), in accordance with an embodiment of the present invention. System 20 comprises a network adapter, in the present example a Network Interface Controller (NIC) 24, which serves a host 28. Host 28 and NIC 24 communicate with one another over a peripheral bus, in the present example a PCIe bus 34. NIC 24 is connected to a network 32, e.g., an Ethernet of InfiniBand™ network.

Host 28 comprises a host CPU 36 (also referred to as a host processor) and a host memory 40, e.g., a Random-Access Memory (RAM). Host processor 36 runs various user applications (not seen in the figure). The user applications may communicate over network 32 using NIC 24, and/or interact with one or more User-Defined Peripheral Devices (UDPD) implemented on NIC 24. Host processor 36 runs a native NIC driver 44 for providing network-communication services to the user applications, and a UDPD driver 48 for providing UDDI services to the user applications.

The configuration of system 20 seen in FIG. 1 is an example, non-limiting configuration. For example, alternatively to PCIe, the peripheral bus may comprise a CXL bus, an NVLink bus, an NVLink-C2C bus, or any other suitable peripheral bus. Host 28 is regarded herein as an example of an external device that can be served by NIC 24. Additionally or alternatively, an external device may comprise, for example, a peer device (e.g., GPU or FPGA) coupled to bus 34 or to the host. A host may be part of a multi-host configuration, in which NIC 24 serves multiple hosts over separate respective logical buses.

In some embodiments, NIC 24 comprises one or more network ports 52 for communicating over network 32, and a host interface 56 (also referred to as a bus interface) for communicating with host 28 (or other external device) over bus 34. NIC 24 further comprises a hardware-implemented data path 60 and a programmable Data-Plane Accelerator (DPA) 64. Data path 60 comprises a plurality of hardware-implemented packet-processing engines that perform various processing tasks needed for network communication between host 28 and network 32, e.g., for sending and receiving packets. DPA 64 runs, possibly among other tasks, user-programmable logic that implements the UDPD. As will be explained below, DPA 60 implements the UDPD by reusing one or more of the packet-processing engines of data path 60.

In the embodiment of FIG. 1, data path 60 comprises the following packet-processing engines:

A transport engine 68—An engine responsible for packet transport reliability and transport protocol implementation.

An address translation engine 72. Given a host virtual address (VA) and a memory key (MKEY) that identifies the buffer registration, address translation engine 72 translates the host virtual address into an IO Virtual Address (IOVA). Engine 72 may support one or more translation types, such as, for example:

Direct mapping—A mapping that translates VAs into respective IOVAs, within the address space defined by the MKEY.

Indirect mapping—A mapping that translates VAs into one or more additional IOVAs or {MKEY, VA} pairs, wherein MKEY may be either direct or indirect (the final step of indirection being a direct-mapped MKEY).

Patterned mapping ("strided mapping")—A mapping that translates VAs into respective one or more IOVAs or {MKEY, VA} pairs in accordance with a periodic pattern of addresses. Each MKEY may be either direct or indirect.

One or more DMA engines 76. A given engine 76 is able to perform parallel, asynchronous and variable-size DMA operations (e.g., DMA read and DMA write) in host memory 40. DMA engine 76 typically receives an instruction comprising an opcode (read/write), one or more IOVAs (or one or more {MKEY, VA} pairs that are then translated into IOVAs) and a length, and executes the requested PCIe transactions to carry out the instruction. In case of a write instruction, the request descriptor may also comprise the data to be written ("inline data").

(In some embodiments, DPA 64 or data path 60 may additionally comprise one or more asynchronous DMA engines that are used only for UDDI.) An asynchronous DMA engine typically receives instructions from DPA 64 to move data between host memory 40 and the DPA memory (fetch data from the host memory to the DPA memory, or write data from the DPA memory to the host memory), executes the instructions asynchronously without blocking forward process of the DPA, and reports to the DPA once execution is completed.

An MSI-X engine 84. An engine that issues MSIX-type interrupts to host processor 36, and/or interrupts to DPA 64.

An interrupt moderation engine 88—An engine that throttles the rate of interrupts issued toward host processor 36 and/or toward DPA 64. Interrupt moderation engine 88 can be configured with a maximum rate of interrupts and/or with a maximum latency permitted in coalescing interrupts.

A doorbell aggregation engine 80—An engine that coalesces multiple doorbells, issued by host processor 36, to a single queue. This sort of coalescing enables NIC 24 to execute only the last doorbell without pre-emption from other doorbells. Since in some embodiments UDDI queues are cyclic, doorbell aggregation engine 80 can store only the last producer index of the queue.

One or more memory-to-memory accelerators 92—Accelerators that accelerate complex computations. A given accelerator 92 typically reads its operands from memory and writes its output back to memory. Computations that may be accelerated include, for example, compression, decompression, encryption, decryption and hash-function evaluation.

The configurations of system 20 and its various components, e.g., NIC 24 and host 28, as depicted in FIG. 1, are example configurations that are chosen purely for the sake of conceptual clarity. Any other suitable configurations can be used in alternative embodiments.

In various embodiments, the disclosed techniques can be used for implementing any suitable peripheral device, e.g., network adapters, storage devices that support various storage protocols, GPUs, FPGAs, etc. User-defined (e.g., emulated) storage devices may support various storage protocols, e.g., Non-Volatile Memory express (NVMe), block-device protocols such as virtio-blk, local or networked file systems, object storage protocols, network storage protocols, etc. Further aspects of UDDI and device emulation are addressed, for example, in U.S. patent application Ser. No. 17/211,928, entitled "Storage Protocol Emulation in a Peripheral Device," filed Mar. 25, 2021, in U.S. patent application Ser. No. 17/372,466, entitled "Network Adapter with Efficient Storage-Protocol Emulation," filed Jul. 11, 2021, in U.S. patent application Ser. No. 17/527,197, entitled "Enhanced Storage Protocol Emulation in a Peripheral Device," filed Nov. 16, 2021, and in India Patent Application 202241052839, entitled "User-Defined Peripheral-Bus Device Implementation," filed Sep. 15, 2022, which are assigned to the assignee of the present patent application and whose disclosures are incorporated herein by reference.

It is noted that the term "user" may refer to various entities, whether individuals or organizations. For example, in a given system, a user-defined peripheral device may be specified by one "user" but accessed by (interfaced with) by a different "user". For example, the user specifying the user-defined peripheral device may be an infrastructure owner, whereas the user using the user-defined peripheral device may be a consumer. In a cloud environment, for example, the former user would be a Cloud Service Provider (CSP) and the latter user could be a guest or tenant. In some cases, however, a user-defined peripheral device may be specified and used by the same user.

In various embodiments, the various components of NIC 24 and host 28 can be implemented using hardware, e.g., using one or more Application-Specific Integrated Circuits (ASIC) and/or Field-Programmable Gate Arrays (FPGA), using software, or using a combination of hardware and software components.

In some embodiments, at least some of the functions of the disclosed system components, e.g., some or all functions of host CPU 36 and/or DPA 64, are implemented using one or more general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

UDDI with Reuse of Data-Path Engines by DPA

When implementing a UDPD, the UDPD interface exposed by NIC 24 typically appears to a user application as a dedicated, local peripheral device. The actual peripheral device, however, may be located remotely from host 28 (e.g., across network 32), shared by one or more other user applications and/or designed to use a different native interface than the user application, or emulated entirely using software.

Thus, in general, user-defined implementation of a peripheral device may involve accessing local devices, communication over a network with remote devices, as well as protocol translation. These operations typically involve sending and/or receiving data units to and from network 32, as well as processing data units in NIC 24.

Depending on the kind of peripheral device being implemented and the protocols involved, data units that are processed by NIC 24 may comprise, for example, packets, messages, data blocks, data objects, descriptors, contexts, work requests, completions, or any other suitable kind of data units. Some types of data units may be communicated over network 32, other types may be communicated with the host, and yet other types may be processed only internally in the NIC.

The embodiments described herein refer mainly to packets, for the sake of clarity, but the disclosed techniques are applicable to data units of any other suitable type. For clarity, data units (e.g., packets) that are processed by NIC 24 as part of UDDI, i.e., as part of implementing a user-defined peripheral device, are referred to as UDPD data units (with UDPD packets being an example). By the same token, data units (e.g., packets) that are processed by NIC 24 as part of network communication are referred to as communication data units (with communication packets being an example).

Using the above terminology, when serving user applications that run on host 28, NIC 24 reuses one or more of the processing engines of data path 60 for both (i) processing of communication packets as part of network communication using native NIC driver 44, and (ii) processing of UDPD packets as part of UDDI using UDPD driver 48.

Typically, although not necessarily, when processing communication packets, data path 60 operates in a pipelined manner, with one processing engine triggering another processing engine. This operation is typically independent of DPA 64. When processing UDPD packets, on the other hand, the various processing engines are typically invoked by DPA 64 as needed.

Reuse of Data-Path Engines—Inbound Packets

Figure 2:
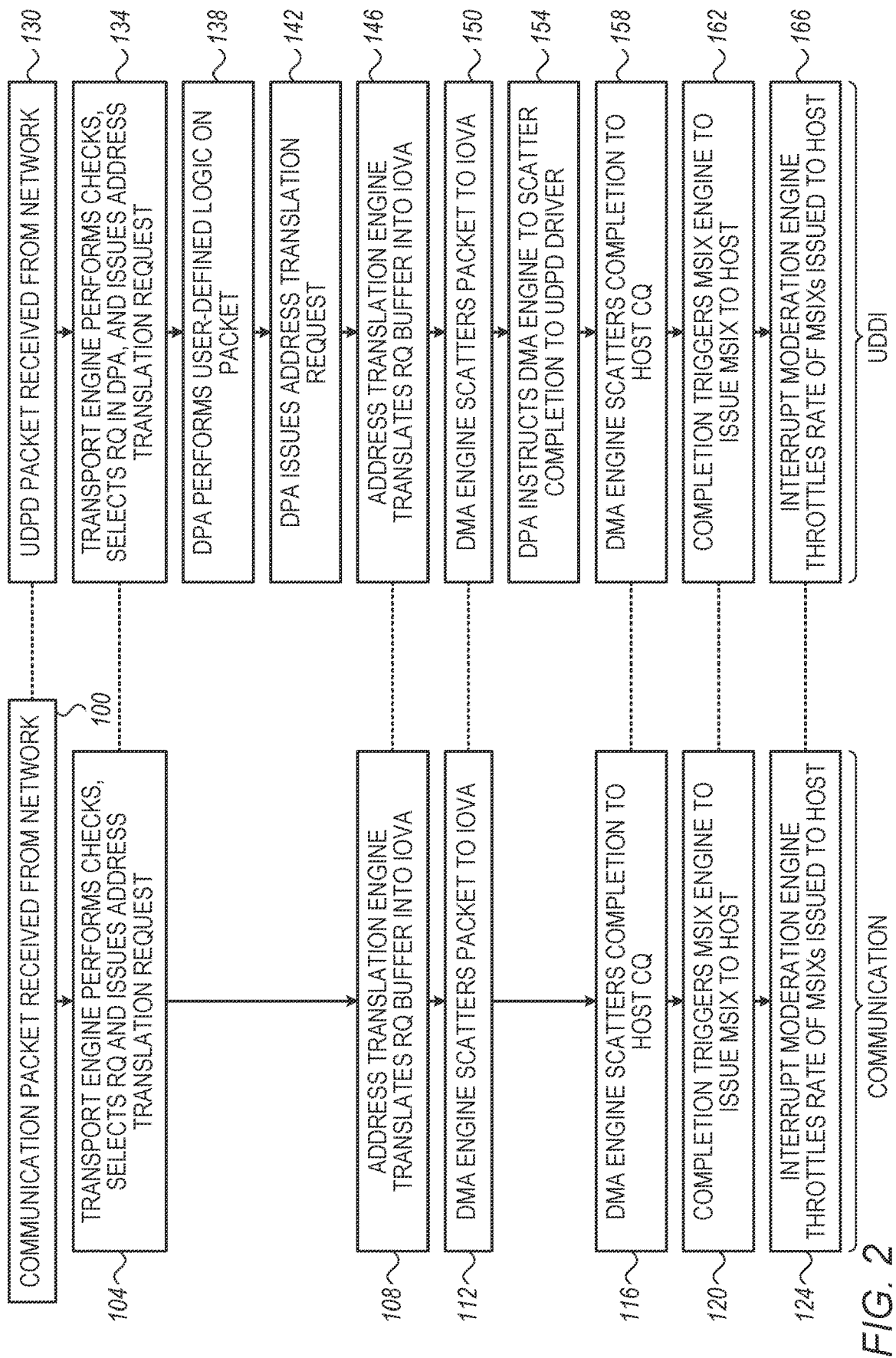
FIG. 2 is a flow chart that schematically illustrates a method for processing inbound communication packets and User-Defined Peripheral Device (UDPD) packets in a Network Interface Controller (NIC), in accordance with an embodiment of the present invention.

FIG. 2 is a flow chart that schematically illustrates a method for processing inbound communication packets and User-Defined Peripheral Device (UDPD) packets in NIC 24, in accordance with an embodiment of the present invention.

The left-hand side of the figure shows the processing of communication packets (also referred to as "communication process"). This process typically does not involve DPA 64. The right-hand side of the figure shows the processing of UDPD packets (also referred to as "UDDI process"). Operations that reuse the same packet-processing engine are marked in the figure by a connecting dashed line.

The communication process (left-hand side of the flow chart) begins with NIC 24 receiving a communication packet from network 32 via one of ports 52, at a communication packet reception stage 100.

At a transport processing stage 104, transport engine 68 performs applicable checks and offloads on the communication packet. Checks may comprise, for example, verification of the IP checksum and TCP checksum and/or checking of the network address (e.g., check for MAC spoofing or for invalid addresses). Offloads may comprise, for example, header decapsulation in tunneled protocols, management of Large Receive Offload (LRO) sessions, and termination of reliability protocols in RDMA such as Packet Sequence Number (PSN) checks. If all checks pass successfully, transport engine 68 selects a Receive Queue (RQ) for the packet, and issues a translation request to address translation engine 72 for the next buffer in the RQ.

At an address translation stage 108, address translation engine 72 translates the RQ buffer address into one or more IOVAs. At a packet scattering stage 112, DMA engine 76 scatters the packet to the IOVA. In some embodiments, the packet may be processed by one or more of memory-to-memory accelerators 92 as needed, e.g., to decompress and/or decrypt the packet.

At a completion scattering stage 116, DMA engine 76 scatters a completion of the packet to a Completion Queue (CQ) in host 28.

In some cases (e.g., depending on user configuration) the completion may trigger MSIX engine 84 to generate an MSIX to host processor 36, at an interrupt generation stage 120. When configured, interrupt moderation engine 88 may throttle the rate of MSIX issued toward the host, at an interrupt moderation stage 124.

The UDDI process (right-hand side of the flow chart) begins with NIC 24 receiving a UDPD packet from network 32 via ports 52, at a UDPD packet reception stage 130.

At a transport processing stage 134, transport engine 68 performs the applicable checks on the UDPD packet, e.g., verifies the IP checksum and TCP checksum, and the network address. If the checks pass successfully, the transport engine 68 selects a Receive Queue (RQ) for the packet. In this case, however, the RQ is associated with DPA 64. In some embodiments the DPA receives the packet on its selected RQ. In other embodiments the packet is written directly to host memory 40, and only packet arrival is issued to the DPA.

At a UDDI stage 138, DPA 64 performs the applicable user-defined logic on the UDPD packet. As part of this stage, DPA 64 may invoke one or more of memory-to-memory accelerators 92 as needed, e.g., to decompress and/or decrypt the packet.

At a translation requesting stage 142, the DPA issues a translation request to address translation engine 72 for the target buffer. At an address translation stage 146, address translation engine 72 translates the RQ buffer address into one or more IOVAs.

At a packet scattering stage 150, DMA engine 76 scatters the UDPD packet to the one or more IOVAs. At a completion requesting stage 154, DPA 64 sends a command to DMA engine 76 to scatter a completion. In response, in some embodiments, DMA engine 76 scatters a completion of the packet to a Completion Queue (CQ) in host 28, at a completion scattering stage 158. In other embodiments, a different scheme for completion indication (e.g., incrementing of a counter) can be used.

In some cases (e.g., depending on user configuration) the completion may trigger MSIX engine 84 to generate an MSIX to host processor 36, at an interrupt generation stage 162. When configured, interrupt moderation engine 88 may throttle the rate of MSIX issued toward the host, at an interrupt moderation stage 166.

Reuse of Data-Path Engines—Outbound Packets

Figure 3:
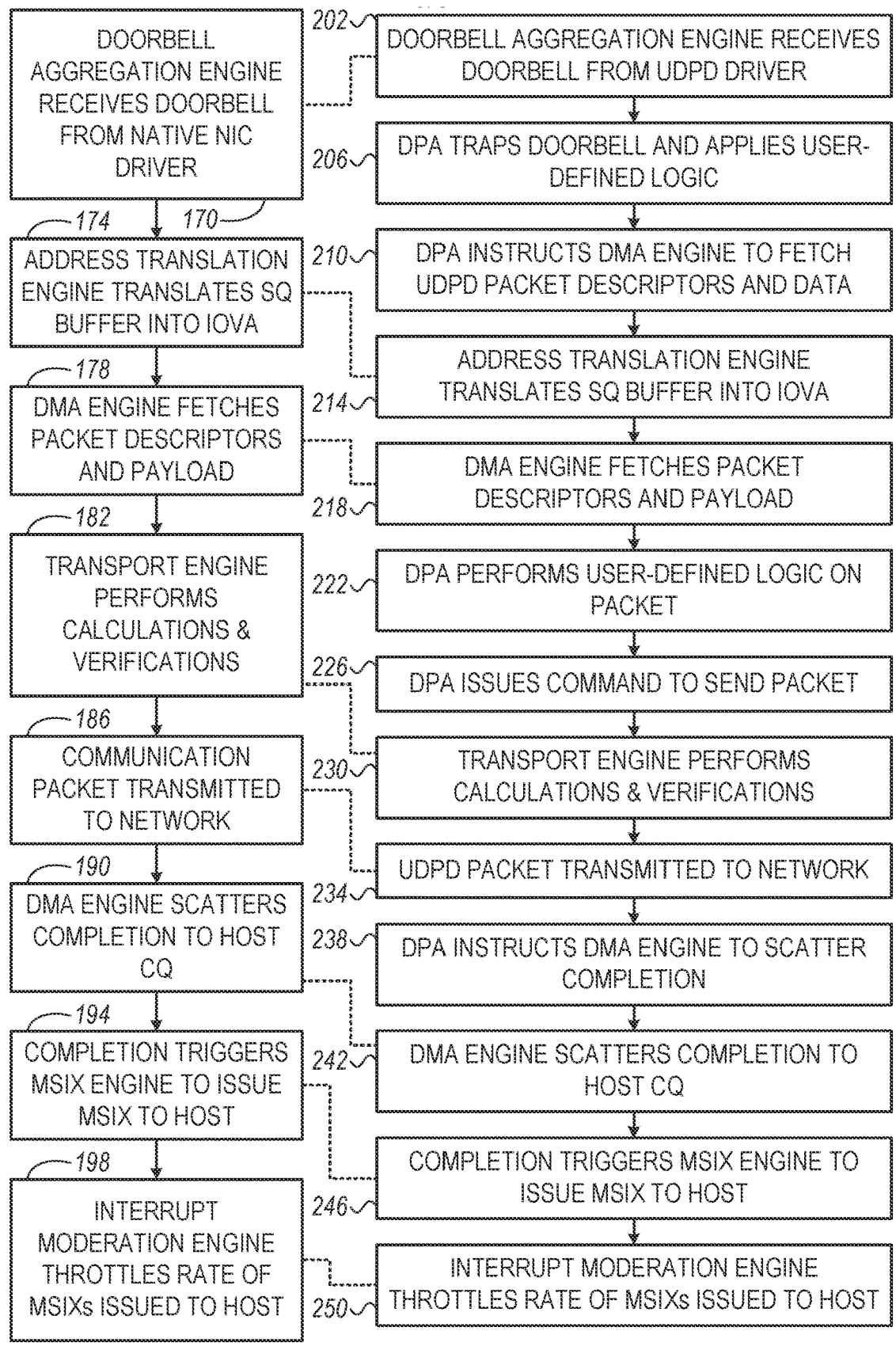
FIG. 3 is a flow chart that schematically illustrates a method for processing outbound communication packets and UDPD packets in a NIC, in accordance with an embodiment of the present invention.

FIG. 3 is a flow chart that schematically illustrates a method for processing outbound communication packets and UDPD packets in NIC 24, in accordance with an embodiment of the present invention. Here, too, the left-hand side of the flow chart shows the processing of communication packets (referred to as "communication process"), and the right-hand side of the flow chart shows the processing of UDPD packets (referred to as "UDDI process"). Operations that reuse the same packet-processing engine are marked in the figure by a connecting dashed line.

The communication process (left-hand side of the flow chart) begins with NIC 24 receiving a doorbell from native NIC driver 44, indicating a new outbound communication packet to be processed. The doorbell typically specifies a Send Queue (SQ) address. Doorbell aggregation engine 80 receives and processes the doorbell, at a doorbell processing stage 170.

Address translation engine 72 translates the SQ buffer address (and/or one or more other addresses contained in the request which exist in the SQ buffer, e.g., a Work Queue Element (WQE) containing a pointer to data) into IOVA, at a translation stage 174. At a fetching stage 178, DMA engine 76 fetches the descriptors and payload of the communication packet from host memory 40, thereby composing the communication packet. In some embodiments, the packet may be processed by one or more of memory-to-memory accelerators 92 as needed, e.g., to compress and/or encrypt the packet.

At a transport processing stage 182, transport engine 68 processes the packet, including, for example, calculating and/or verifying fields such as IP checksum, TCP checksum and network addresses, and/or performing offloads such as Large Send Offload (LSO). Transport engine 68 may implement the transport layer, fully or partially, such as add RDMA Packet Sequence Numbers (PSNs), etc. At a transmission stage 186, the communication packet is transmitted to network 32 via one of ports 52.

At a completion scattering stage 190, DMA engine 76 scatters a completion of the packet to the host CQ. In some cases (e.g., depending on user configuration), the completion may trigger MSIX engine 84 to generate an MSIX to host processor 36, at an interrupt generation stage 194. When configured, interrupt moderation engine 88 may throttle the rate of MSIX issued toward the host, at an interrupt moderation stage 198.

The UDPD process (right-hand side of the flow chart) begins with NIC 24 receiving a doorbell from UDPD driver 48, indicating a new outbound UDPD packet to be processed. The doorbell typically specifies a UDDI queue address. In some embodiments, doorbell aggregation engine 80 receives and processes the doorbell, at a doorbell processing stage 202. At a doorbell trapping stage 206, DPA 64 traps the doorbell and executes the applicable user-defined processing to the trapped doorbell.

At a fetch requesting stage 210, DPA 64 issues a command to DMA engine 76 to fetch the descriptors and data of the UDPD packet from host memory 40. At an address translation stage 214, address translation engine 72 translates the SQ buffer address (and/or additional addresses indicated by the descriptors in the SQ buffer, such as virtio-net available-ring that points to a descriptor table, which in turn points to packets and/or additional entries in the descriptor table) into IOVA. At a fetching stage 218, DMA engine 76 fetches the descriptors and payload of the UDPD packet from host memory 40, thereby composing the UDPD packet.

At a UDDI stage 222, DPA 64 performs the applicable user-defined logic on the UDPD packet. As part of this stage, DPA 64 may invoke one or more of memory-to-memory accelerators 92 as needed, e.g., to compress and/or encrypt the packet.

At a send requesting stage 226, in some embodiments the DPA issues a command to transport engine 68 to send the packet. At a transport processing stage 230, transport engine 68 processes the packet, including, for example, calculating and/or verifying fields such as IP checksum, TCP checksum and network addresses. At a transmission stage 234, the communication packet is transmitted to network 32 via one of ports 52.

At a completion requesting stage 238, DPA 64 sends a command to DMA engine 76 to scatter a completion. In response, DMA engine 76 scatters a completion of the packet to a Completion Queue (CQ) in host 28, at a completion scattering stage 242. As noted above, a CQ is only one possible way of indicating completion. In other embodiments, any other implementation can be used, e.g., using a counter.

In some cases (e.g., depending on user configuration) the completion may trigger MSIX engine 84 to generate an MSIX to host processor 36, at an interrupt generation stage 246. When configured, interrupt moderation engine 88 may throttle the rate of MSIX issued toward the host, at an interrupt moderation stage 250.

Although the embodiments described herein mainly address user-defined implementation of peripheral-bus devices, the methods and systems described herein can also be used in other applications, such as in implementing sub-device functionality within an existing device.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network adapter, comprising:
   a network interface, to communicate with a network;
   a bus interface, to communicate with an external device over a peripheral bus;
   a hardware-implemented data-path, comprising a plurality of packet-processing engines, to process data units exchanged between the network and the external device; and
   a programmable Data-Plane Accelerator (DPA), to expose on the peripheral bus a User-Defined Peripheral-bus Device (UDPD), to run user-programmable logic that implements the UDPD, and to process transactions issued from the external device to the UDPD by reusing at least a given packet-processing engine among the packet-processing engines of the data-path,
   wherein (i) in processing the data units, the given packet-processing engine in the data-path is to be triggered by a preceding packet-processing engine in the data-path, and (ii) in processing the transactions issued to the UDPD, the given packet-processing engine is to be invoked by the DPA.

2. The network adapter according to claim 1, wherein the UDPD is one of:
   a network adapter;
   a storage device;
   a Graphics Processing Unit (GPU); and
   a Field Programmable Gate Array (FPGA).

3. The network adapter according to claim 1, wherein:
   in processing the data units, the data-path is to communicate over the peripheral bus with a network-adapter driver running on the external device; and in processing the transactions issued to the UDPD, the DPA is to communicate over the peripheral bus with a UDPD driver running on the external device.

4. The network adapter according to claim 1, wherein:
the given packet-processing engine comprises a hardware-implemented transport engine to perform transport-protocol checks and/or offloads on incoming communication data units and to select receive-queues for the incoming communication data units; and
the DPA is to re-use the transport engine to perform transport-protocol checks and/or offloads on incoming UDPD data units associated with the UDPD, and to select receive-queues for the incoming UDPD data units.

5. The network adapter according to claim 1, wherein:
the given packet-processing engine comprises a hardware-implemented address-translation engine to translate between virtual addresses in a first address space and addresses assigned to the communication data units in a second address space; and
the DPA is to re-use the address-translation engine to translate between virtual addresses in a third address space and addresses assigned to UDPD data units associated with the UDPD in a fourth address space.

6. The network adapter according to claim 1, wherein:
the given packet-processing engine comprises at least one hardware-implemented Direct Memory Access (DMA) engine to scatter data from at least some of the communication data units to memory, and to transfer completion notifications for the communication data units; and
the DPA is to re-use the DMA engine to scatter data from UDPD data units, associated with the UDPD, to the memory, and to transfer completion notifications for the UDPD data units.

7. The network adapter according to claim 1, wherein:
the given packet-processing engine comprises a hardware-implemented message-signaled-interrupt engine to trigger the external device with interrupts upon completions of processing of at least some of the data units; and
the DPA is to re-use the message-signaled-interrupt engine to trigger the external device with interrupts upon completions of processing of UDPD data units associated with the UDPD.

8. The network adapter according to claim 1, wherein:
the given packet-processing engine comprises an interrupt-moderation engine to throttle a rate of interrupts that indicate completions of at least some of the communication data units; and
the DPA is to re-use the interrupt-moderation engine to throttle a rate of the interrupts that indicate the completions of the UDPD data units.

9. The network adapter according to claim 1, wherein:
the given packet-processing engine comprises a doorbell-aggregation engine to coalesce doorbells relating to the communication data units; and
the DPA is to re-use the doorbell-aggregation engine to coalesce doorbells relating to UDPD data units associated with the UDPD.

10. A method in a network adapter, the method comprising:
communicating with a network;
communicating with an external device over a peripheral bus;
using a hardware-implemented data-path that includes a plurality of packet-processing engines, processing data units exchanged between the network and the external device; and
using a programmable Data-Plane Accelerator (DPA), exposing on the peripheral bus a User-Defined Peripheral-bus Device (UDPD), running user-programmable logic that implements the UDPD, and processing transactions issued from the external device to the UDPD by reusing at least a given packet-processing engine among the packet-processing engines of the data-path,
wherein (i) in processing the data units, the given packet-processing engine in the data-path is to be triggered by a preceding packet-processing engine in the data-path, and (ii) in processing the transactions issued to the UDPD, the given packet-processing engine is to be invoked by the DPA.

11. The method according to claim 10, wherein the UDPD is one of:
a network adapter;
a storage device;
a Graphics Processing Unit (GPU); and
a Field Programmable Gate Array (FPGA).

12. The method according to claim 10, wherein:
processing the data units comprises communicating over the peripheral bus with a network-adapter driver running on the external device; and
processing the transactions issued to the UDPD comprises communicating over the peripheral bus with a UDPD driver running on the external device.

13. The method according to claim 10, wherein:
the given packet-processing engine comprises a hardware-implemented transport engine;
processing the data units comprises, by the hardware-implemented transport engine, performing transport-protocol checks and/or offloads on incoming communication data units and selecting receive-queues for the incoming communication data units; and
re-using the transport engine by the DPA comprises performing transport-protocol checks and/or offloads on incoming UDPD data units associated with the UDPD, and selecting receive-queues for the incoming UDPD data units.

14. The method according to claim 10, wherein:
the given packet-processing engine comprises a hardware-implemented address-translation engine;
processing the data units comprises, by the hardware-implemented address-translation engine, translating between virtual addresses in a first address space and addresses assigned to the communication data units in a second address space; and
re-using the address-translation engine by the DPA comprises translating between virtual addresses in a third address space and addresses assigned to UDPD data units associated with the UDPD in a fourth address space.

15. The method according to claim 10, wherein:
the given packet-processing engine comprises a hardware-implemented Direct Memory Access (DMA) engine;
processing the data units comprises, by the hardware-implemented Direct Memory Access (DMA) engine, scattering data from at least some of the communication data units to memory, and transferring completion notifications for the communication data units; and
re-using the DMA engine by the DPA comprises scattering data from UDPD data units, associated with the UDPD, to the memory, and transferring completion notifications for the UDPD data units.

16. The method according to claim 10, wherein:

the given packet-processing engine comprises a hardware-implemented message-signaled-interrupt engine;

processing the data units comprises, by the hardware-implemented message-signaled-interrupt engine, triggering the external device with interrupts upon completions of processing of at least some of the data units; and re-using the message-signaled-interrupt engine by the DPA comprises triggering the external device with interrupts upon completions of processing of UDPD data units associated with the UDPD.

17. The method according to claim 10, wherein:

the given packet-processing engine comprises a hardware-implemented interrupt-moderation engine;

processing the data units comprises, by the hardware-implemented interrupt-moderation engine, throttling a rate of interrupts that indicate completions of at least some of the communication data units; and re-using the interrupt-moderation engine by the DPA comprises throttling a rate of the interrupts that indicate the completions of the UDPD data units.

18. The method according to claim 10, wherein:

the given packet-processing engine comprises a doorbell-aggregation engine;

processing the data units comprises, by the doorbell-aggregation engine, coalescing doorbells relating to the communication data units; and re-using the doorbell-aggregation engine by the DPA comprises coalescing doorbells relating to UDPD data units associated with the UDPD.

19. A network adapter, comprising:

a network interface, to communicate with a network;

a bus interface, to communicate with an external device over a peripheral bus;

a hardware-implemented data-path, comprising a plurality of packet-processing engines, to process data units exchanged between the network and the external device; and a programmable Data-Plane Accelerator (DPA), to run user-programmable logic that implements a User-Defined Peripheral-bus Device (UDPD), including reusing, in implementing the UDPD, at least a given packet-processing engine among the packet-processing engines of the data-path, wherein (i) in processing the data units, the given packet-processing engine in the data-path is to be triggered by a preceding packet-processing engine in the data-path, and (ii) in processing transactions issued to the UDPD, the given packet-processing engine is to be invoked by the DPA.

* * * * *